US009575799B2

(12) United States Patent
Agarwal et al.

(10) Patent No.: US 9,575,799 B2
(45) Date of Patent: Feb. 21, 2017

(54) TASK ASSOCIATION ANALYSIS IN APPLICATION MAINTENANCE SERVICE DELIVERY

(71) Applicant: International Business Machines Corporation, Armonk, NY (US)

(72) Inventors: Shivali Agarwal, Pradesh (IN); Yi-Min Chee, Yorktown Heights, NY (US); Hao Chen, Beijing (CN); Ya Bin Dang, Beijing (CN); Feng Li, Beijing (CN); Shao Chun Li, Beijing (CN); Rong Liu, Sterling, VA (US); Renuka Sindhgatta, Bangalore (IN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 14/329,332

(22) Filed: Jul. 11, 2014

(65) Prior Publication Data
US 2016/0011902 A1    Jan. 14, 2016

(51) Int. Cl.
G06F 9/44 (2006.01)
G06F 9/46 (2006.01)
G06Q 10/06 (2012.01)

(52) U.S. Cl.
CPC .......... G06F 9/46 (2013.01); G06Q 10/06312 (2013.01); *G06Q 10/06316* (2013.01)

(58) Field of Classification Search
None
See application file for complete search history.

(56) References Cited

U.S. PATENT DOCUMENTS

| | | | | |
|---|---|---|---|---|
| 5,530,861 A * | 6/1996 | Diamant | ............. | G06F 9/45512 705/7.21 |
| 6,023,702 A * | 2/2000 | Leisten | ................. | G06Q 10/06 |
| 6,349,287 B1 * | 2/2002 | Hayashi | ................. | G06Q 10/10 700/103 |
| 7,406,432 B1 * | 7/2008 | Motoyama | ............. | G06Q 10/06 705/7.16 |
| 8,321,257 B2 * | 11/2012 | Motoyama | ............. | G06Q 10/06 705/7.13 |
| 8,335,705 B2 * | 12/2012 | Ehrler | ............. | G06Q 10/06311 379/201.05 |
| 8,620,703 B1 * | 12/2013 | Kapoor | ............ | G06Q 10/06311 705/7.11 |

(Continued)

OTHER PUBLICATIONS

Kar, G., et al., "Managing Application Services over Service Provider Networks: Architecture and Dependency Analysis", Network Operations and Management Symposium, 2000, NOMS 2000, Date of Conference: Apr. 2000 pp. 61-74.

Koschmider, A., et al., "Social Software for Modeling Business Processes", BPM 2008 International Workshops, Sep. 1-4, 2008, pp. 666-677, Milan, Italy.

Gu, Z., et al., "A Model-Based Approach to System-Level Dependency and Real-Time Analysis of Embedded Software", The 9th IEEE Real-Time and Embedded Technology and Applications Symposium, Date of Conference: May 27-30, 2003, pp. 78-85.

(Continued)

*Primary Examiner* — Matthew Brophy
(74) *Attorney, Agent, or Firm* — Scully, Scott, Murphy & Presser, P.C.; Louis J. Percello, Esq.

(57) ABSTRACT

Analyzing task associations may compute artifact associations for a plurality of artifacts based on historical task submission logs. From the computed artifact associations, shared artifacts that have artifact association with targeted artifacts that are associated with planned tasks, may be determined. Task association between the planned tasks may be identified based on the shared artifacts. Task associations may be analyzed to determine one or more of task assignment and task schedule for the planned tasks.

20 Claims, 15 Drawing Sheets

(56) References Cited

U.S. PATENT DOCUMENTS

| | | | | |
|---|---|---|---|---|
| 8,620,704 | B1* | 12/2013 | Kapoor | G06Q 10/06316 705/7.11 |
| 8,626,542 | B1* | 1/2014 | Kapoor | G06Q 10/06 705/7.11 |
| 8,683,473 | B2* | 3/2014 | Maresh | G06Q 10/0631 718/103 |
| 8,781,869 | B2* | 7/2014 | Cantor | G06Q 10/06 705/7.12 |
| 2004/0167652 | A1* | 8/2004 | Ishii | G06Q 10/06 700/100 |
| 2004/0254820 | A1* | 12/2004 | Ishii | G05B 19/418 705/32 |
| 2006/0047558 | A1* | 3/2006 | Uchiyama | G06Q 10/00 705/7.16 |
| 2006/0053043 | A1* | 3/2006 | Clarke | G06Q 10/06311 705/7.17 |
| 2007/0005413 | A1* | 1/2007 | Hennings | G06Q 10/06311 705/7.13 |
| 2007/0073575 | A1* | 3/2007 | Yomogida | G06Q 10/06311 705/7.15 |
| 2008/0021757 | A1* | 1/2008 | Majd | G06Q 10/06311 705/7.15 |
| 2009/0234699 | A1* | 9/2009 | Steinglass | G06Q 10/06313 705/7.23 |
| 2009/0299782 | A1* | 12/2009 | Cantor | G06Q 10/06312 705/7.22 |
| 2009/0319323 | A1* | 12/2009 | Fishman | G06Q 50/188 705/80 |
| 2010/0010860 | A1* | 1/2010 | Bose | G06Q 10/06311 705/7.14 |
| 2010/0131916 | A1* | 5/2010 | Prigge | G06F 8/10 717/104 |
| 2010/0174578 | A1* | 7/2010 | Duffy | G06Q 10/06311 705/7.14 |
| 2010/0299171 | A1* | 11/2010 | Lau | G06Q 10/06 705/7.15 |
| 2010/0305994 | A1* | 12/2010 | Gaskell | G06Q 10/06 705/7.23 |
| 2011/0145034 | A1* | 6/2011 | Moore | G06Q 10/00 705/7.17 |
| 2011/0252019 | A1* | 10/2011 | Lamothe | G06Q 10/06 707/720 |
| 2011/0270644 | A1* | 11/2011 | Roncolato | G06Q 10/06 705/7.22 |
| 2011/0288900 | A1* | 11/2011 | McQueen | G06Q 10/06311 705/7.16 |
| 2012/0116834 | A1* | 5/2012 | Pope | G06Q 10/06316 705/7.26 |
| 2012/0116835 | A1* | 5/2012 | Pope | G06Q 10/06316 705/7.26 |
| 2012/0123949 | A1* | 5/2012 | Gupta | G06Q 10/103 705/301 |
| 2012/0304187 | A1* | 11/2012 | Maresh | G06Q 10/1093 718/103 |
| 2013/0144679 | A1* | 6/2013 | Burnett | G06Q 10/06313 705/7.27 |
| 2014/0012616 | A1* | 1/2014 | Moshenek | G06Q 10/06311 705/7.15 |
| 2014/0122161 | A1* | 5/2014 | Gupta | G06Q 10/06316 705/7.26 |
| 2014/0257940 | A1* | 9/2014 | Crenshaw | G06Q 10/06398 705/7.42 |
| 2015/0324728 | A1* | 11/2015 | De | G06Q 10/06 705/7.15 |

OTHER PUBLICATIONS

Fernandez, R. M., et al., "A Dilemma of State Power: Brokerage and Infuence in the National Health Policy Domain", American Journal of Sociology, May 1994, pp. 1455-1491, vol. 99, No. 6.

Egyed, A., "A Scenario-Driven Approach to Trace Dependency Analysis", IEEE Transactions on Software Engineering, Feb. 2003, pp. 116-132, vol. 29, No. 2.

Cox, L., et al., "Dependency Analysis Using Conceptual Graphs", 9th International Conference on Conceptual Structures, Broadening the Base, Jul. 30-Aug. 3, 2001, pp. 117-130.

Bonacich, P., "Power and Centrality: A Family of Measures", American Journal of Sociology, Mar. 1987, vol. 92, No. 5, pp. 1170-1182.

Wilde, N. et al., "Dependency Analysis Tools: Reusable Components for Software Maintenance", Proceedings, Conference on Software Maintenance, 1989, Date of Conference: Oct. 16-19, 1989, pp. 126-131.

Zur Muehlen, M., et al., "Organizational Management in Workflow Applications—Issues and Perspectives", Information Technology and Management, Jul.-Oct. 2004, pp. 271-291, 5, 3-4; ABI/INFORM Global.

Dustdar, S., et al., "The Social Compute Unit", Internet Computing, IEEE, May 2011, pp. 64-69, vol. 15, Issue 3.

Van Der Aalst, W. M. P., et al., "Mining Social Networks: Uncovering Interaction Patterns in Business Processes", Business Process Management, Lecture Notes in Computer Science, Jun. 17-18, 2004, pp. 244-260, vol. 3080, Second International Conference, BPM 2004, Potsdam, Germany.

Sengupta, B. et al., "Who Do You Call? Problem Resolution Through Social Compute Units", Proceeding ICSOC'12, Nov. 12-15, 2012, Proceedings of the 10th international conference on Service-Oriented Computing, pp. 48-62, Shanghai, China.

Russell, N. et al., "Work Distribution & Resource Management in BPEL4People: Capabilities & Opportunities", Advanced Information Systems Engineering, Lecture Notes in Computer Science, Jun. 16-20, 2008, pp. 94-108, vol. 5074, 20th International Conference, CAiSE, Montpellier, France.

Pimmler, T. U., et al., "Integration Analysis of Product Decompositions", ASME Design Theory and Methodology Conference, Sep. 1994, pp. 1-10, Minneapolis, MN.

Newman, M. E. J., "The structure and function of complex networks", SIAM Review, Submitted on Mar. 25, 2003 pp. 1-58, 45, 167-256.

Khan, R. N., et al., "Social Networking and BPM of the Future", BP Trends, Sep. 2009, 2 pages.

IBM, "IBM Connections", http://www-03.ibm.com/software/products/en/conn, printed on Jul. 10, 2014, 2 pages.

Girvan, M. et al., "Community structure in social and biological networks", PNAS, Jun. 11, 2002, 8 pages vol. 99, No. 12.

Erol. S., et al., "Combining BPM and social software: contradiction or change?", J. Softw. Maint. Evol.: Res. Pract., Apr. 29, 2010, pp. 449-476, 22, Wiley Online Library.

Dustdar, S., et al., "Interaction pattern detection in process oriented information systems", Data & Knowledge Engineering, Jul. 2007, pp. 138-155, vol. 62.

Du, W., et al., "Enterprise Workflow Resource Management", Hewlett Packard, Jan. 1999. 15 pages.

Dengler, F., et al., "Social Software for Coordination of Collaborative Process Activities", Business Process Management Workshops, Lecture Notes in Business Information Processing, Sep. 13-15, 2010, pp. 396-407, vol. 66.

Blei, D. M., et al., "Latent Dirichlet Allocation", Journal of Machine Learning Research, Jan. 2003, pp. 993-1022, vol. 3.

Basu, S., et al., "Toward Web Service Dependency Discovery for SOA Management", Services Computing, Jul. 7-11, 2008, pp. 422-429, SCC '08, IEEE, vol. 2.

Bagchi, S., et al., "Dependency Analysis in Distributed Systems using Fault Injection: Application to Problem Determination in an e-commerce Environment", 12th International Workshop on Distributed Systems: Operations and Management, Oct. 15-17, 2001, 14 pages, DSOM'2001, Nancy, France.

* cited by examiner

TASK ASSOCIATION ANALYSIS IN APPLICATION MAINTENANCE SERVICE DELIVERY

FIELD

The present application relates generally to computers, and computer applications, and more particularly to information technology (IT) system service and delivery and IT incident management.

BACKGROUND

Enterprises run on many applications that interact with each other and are inter-dependent. As a result, tasks of application support and maintenance are usually inter-related. An application maintenance task often modifies one or more application artifacts (e.g. codes and data structure). At design/plan time generally, only artifacts that are directly targeted by a task are considered even though execution of a task may change more artifacts because of direct/indirect impact.

Executing maintenance tasks without recognizing artifact associations and consequently task associations causes delayed and low quality delivery. In current practice, task association analysis is conducted manually and ad-hoc, often when a problem arises. Inappropriate task assignment to resources may cause severe interlock among task owners; in addition, there is lack of definitive guidance for collaboration among task owners. Because of complicated task associations, task assignment becomes difficult without a systematical approach to considering the hard or soft constraints imposed by task-resource matching, task associations, and resource-resource relationships.

BRIEF SUMMARY

A method of analyzing task associations, in one aspect, may comprise computing artifact associations for a plurality of artifacts based on historical task submission logs, an artifact association representing a degree to which two artifacts are processed by a same task. The method may also comprise receiving planned tasks and targeted artifacts, the targeted artifacts to be modified by one or more of the planned tasks. The method may further comprise determining from the computed artifact associations, shared artifacts that have artifact association with the targeted artifacts. The method may also comprise identifying task association between the planned tasks based on the shared artifacts, wherein a plurality of task associations can be determined for a plurality of tasks. The method may also comprise analyzing the task associations to determine one or more of task assignment and task schedule for the planned tasks.

A system for analyzing task associations, in one aspect, may comprise a hardware processor and a storage device. The hardware processor may be operable to compute artifact associations for a plurality of artifacts based on historical task submission logs, an artifact association representing a degree to which two artifacts are processed by a same task and further operable to store the artifact association on the storage device. The hardware processor may be further operable to receive planned tasks and targeted artifacts, the targeted artifacts to be modified by one or more of the planned tasks. The hardware processor may be further operable to determine from the computed artifact associations, shared artifacts that have artifact association with the targeted artifacts. The hardware processor may be further operable to identify task association between the planned tasks based on the shared artifacts, wherein a plurality of task associations can be determined for a plurality of tasks. The hardware processor may be further operable to analyze the task associations to determine one or more of task assignment and task schedule for the planned tasks.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
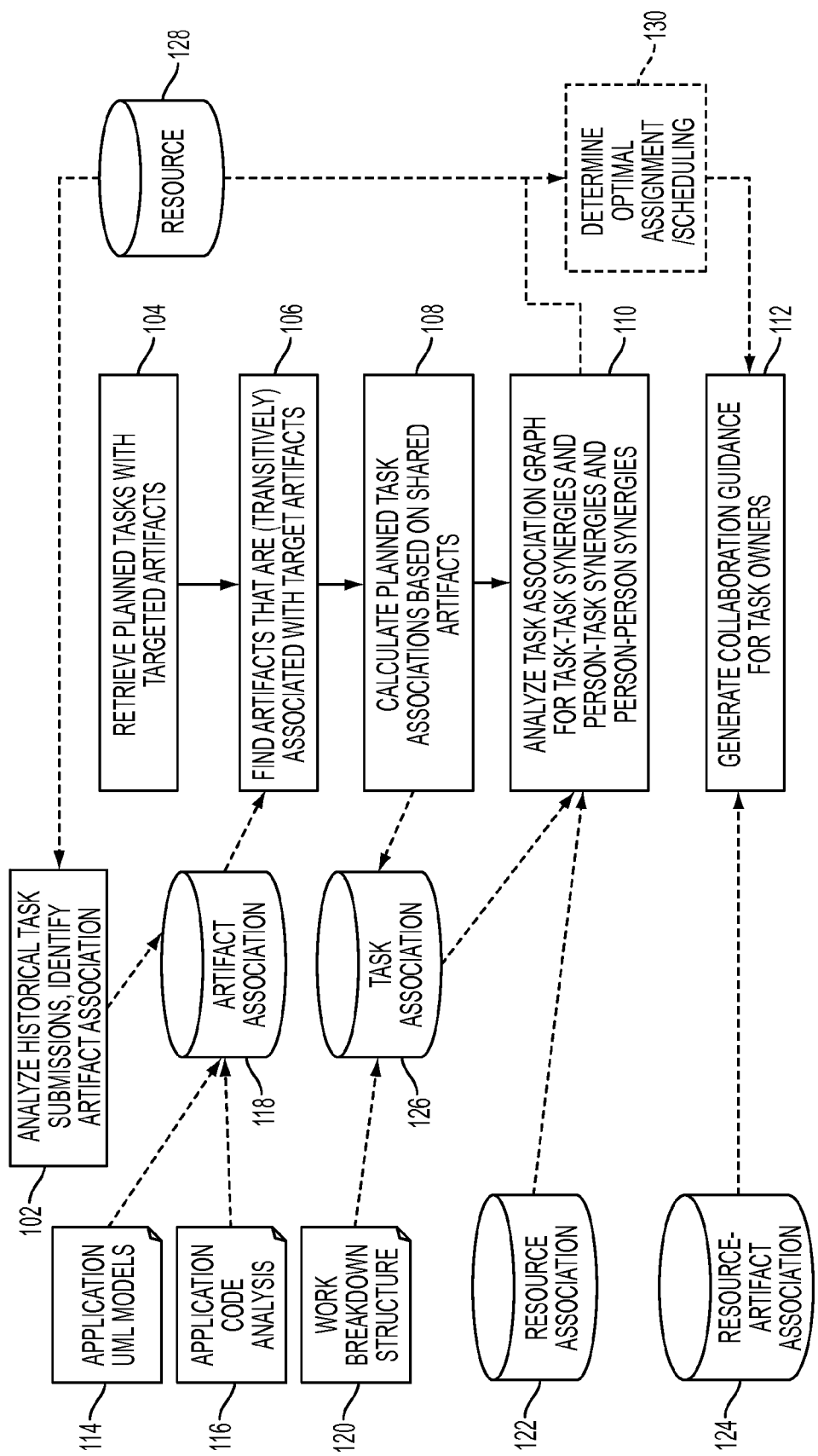
FIG. 1 is a flow diagram illustrating a method of associating tasks and analyzing the task association in one embodiment.

In one embodiment of the present disclosure, a systematic approach is presented that analyze associations among application artifacts and tasks, and utilize identified associations to facilitate task assignment and resource collaboration.

Artifacts or application artifacts refer to application code, objects and/or data structure used to implement an application. This approach may comprise calculating artifact associations by analyzing historical task submission logs. Artifact association may be defined as the frequency of two artifacts modified by the same task. The approach may also comprise analyzing an association between two planned tasks based on identified artifact associations. Task association may be defined as the estimated frequency of two (planned) tasks modifying the same artifacts. A task association graph may be generated based on the association between tasks. The approach may also comprise analyzing a task association graph, e.g., and modularizing tasks for parallel execution, finding critical tasks considered to be critical based on one or more criteria that demand experienced resources, and generating collaboration guidance for owners of closely associated task based on the analyzing. The approach may also comprise optimizing task assignment/scheduling by maximizing task-task, person-task, and person-person synergies, e.g., in addition to traditional objectives.

For instance, an application suite may have many components that are intertwined and has many dependencies horizontally across other applications of an enterprise, for example, fourth, fifth, sixth order, or even higher order dependencies. In such inter-dependent systems, unknown relationships between components of one application suite (e.g., a policy claim application suite) and components in another application suite (e.g., a life annuity application suite) may tend to get missed and/or be discovered in a later stage of an application lifecycle, e.g., during system test. These newly-discovered dependencies cause late design changes and rework at a later stage.

A methodology of the present disclosure in one embodiment analyzes for task associations and identifies dependencies among planned tasks. The methodology of the present disclosure in one embodiment may enhance and structure communication among task owners on inter-relationship among tasks (e.g., application maintenance tasks) and on potential issues caused by inter-relationship. In one aspect, the methodology may calculate an application artifact association degree by analyzing historical task submission logs, create task association graphs on application dependencies and application artifact association, create communities of task owners by analyzing the task association graphs, and monitor collaboration performance of task owners.

The methodology of the present disclosure may be applicable in global IT service delivery model, IT incident management, and others. A global service deliver model, e.g., is used by companies engaged in IT consulting and services delivery business to execute a technology project. IT incident management tries to restore a normal service operation as quickly as possible and to minimize the impact on business operations, thus ensuring that the best possible levels of service quality and availability are maintained. IT incident management resolves incidents, an event which is not part of the standard operation of a service and which causes, or may cause, an interruption to or a reduction in, the quality of that service. IT incident management tries to restore normal operations as quickly as possible with the least possible impact on either the business or the user, at a cost-effective price.

FIG. 1 is a flow diagram illustrating a method of associating tasks and analyzing the task association in one embodiment. At 102, artifact association may be identified, e.g., by analyzing historical task submission logs, e.g., from task management tools. An example of such a tool may be Rational Team Concert (RTC)™ from International Business Corporation (IBM)®, Armonk, N.Y. Historical task submission logs may contain data such as which task modified which artifact. A task can be defined as a piece of work that modifies some capability or function of an application. For example, for a customer management application, modifying the user interface for displaying customer information (e.g., phone #, address etc.) is a task. An artifact can be program code, a data object, e.g., user interface, or even documentation (e.g., user manual). A task, e.g., may include an application maintenance task for performing a function to maintain an application.

Figure 2:
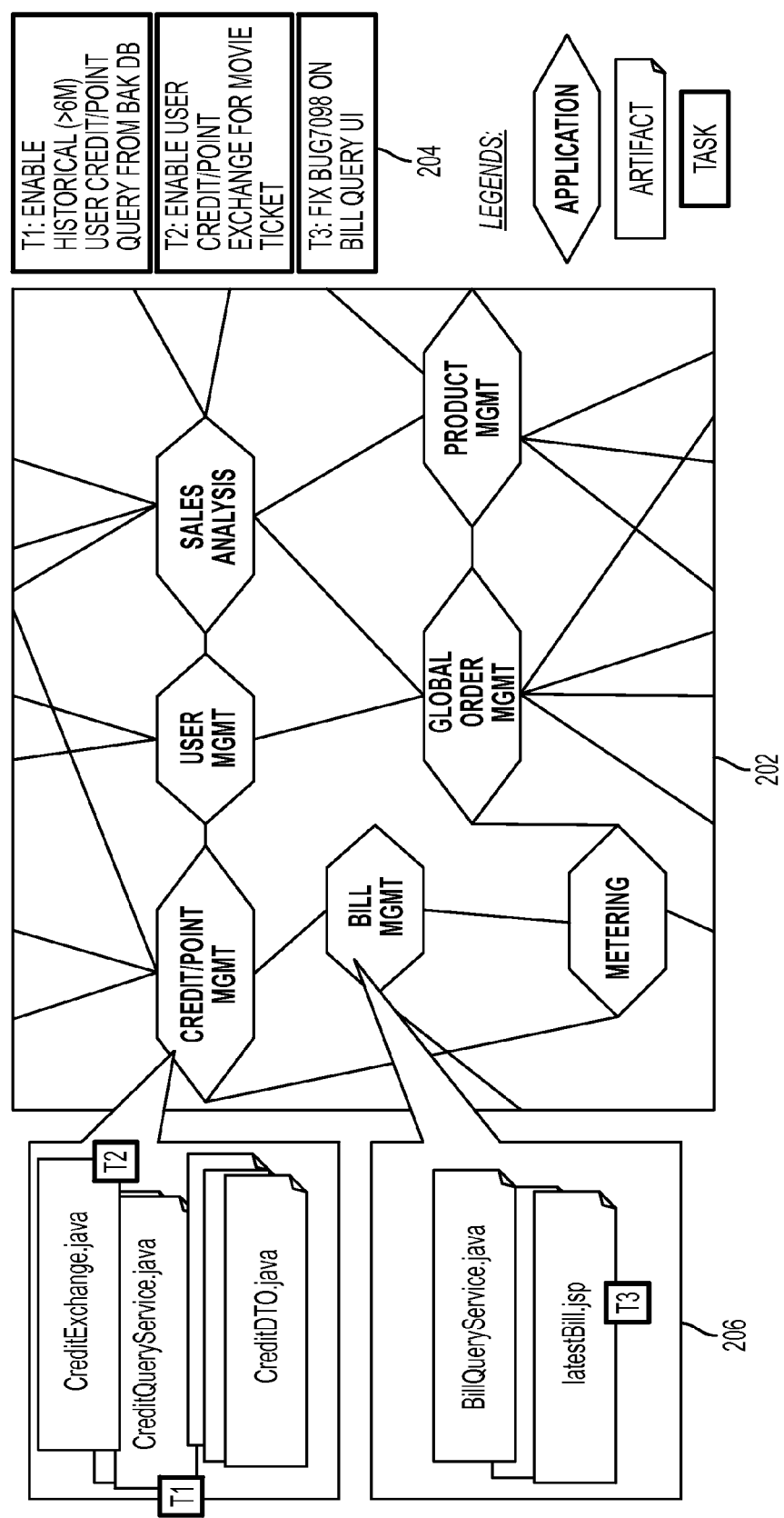
FIG. 2 shows an example of applications, tasks and artifacts and their inter-relationships.

FIG. 2 shows an example of applications, tasks and artifacts and their inter-relationships. For instance, an enterprise may run on many applications 202 that interact with each other and are inter-dependent, e.g., as shown by the lines connecting the applications 202. Applications have artifacts, e.g., application code, data objects, etc 206. Tasks 204 touch or modify one or more artifacts, e.g., in performing their respective functions. For example, an application maintenance task may modify one or more application artifacts, e.g., application codes in maintaining or supporting the application. In the example shown, task T1 may modify CreditQueryService.java artifact and task T2 may modify CreditExchange.java artifact, which are artifacts of Credit/Point Mgmt application. Task T3 may modify latestBill.jsp artifact which is an artifact of Bill Mgmt application. Associations between the tasks 204 depend on artifacts 206.

Referring back to FIG. 1, artifact association may be identified or computed between two or more artifacts. Artifacts may be retrieved, e.g., from application Unified Modeling Language (UML) models 114, application code having pieces of application components 116 (e.g., determined by analysis of application code), and/or others. The identified associations may be stored, e.g., in a storage device or database of artifact associations 118. An artifact association may be defined as a degree to which two artifacts are processed by a single task, e.g., the frequency of two artifacts being modified by a single task, e.g., how many tasks modify both artifacts.

At 104, planned tasks with targeted artifacts may be retrieved or received. For example, two or more planned tasks may be received. Planned tasks may be those that are planned to be executed, e.g., for application maintenance or support. A targeted artifact is one that a planned task directly modifies, e.g., in the course of the task execution.

At 106, artifacts that are either directly or transitively (indirectly) associated with the targeted artifacts are identified, e.g., from the database of artifact associations 118. Artifacts A and B are referred to s being directly associated, if artifact A modifies Artifact B, or vice verse. Artifacts A and C are transitively associated if artifact A is associated with another artifact that in turn is associated with artifact C; e.g., if artifact A is associated with artifact B, and artifact B is associated with artifact C, then transitively, A is associated with C. Assume A is a target artifact, then B and C are also included in the identification. In one embodiment of the present disclosure, artifacts with artifact association values that meet a criterion, e.g., meet a threshold value may be identified as having artifact association with the targeted artifacts.

At 108, one or more task associations for the planned tasks are computed or identified based on one or more artifacts identified to be associated with the target artifacts (identified at 106). Those artifacts are also referred to as shared artifacts. One or more identified task associations are stored in a storage device, e.g., in a database of task associations 126. For example, the database of task associations 126 may store a plurality of tasks obtained from a work break down structure 120 that specifies or lists tasks. The task associations identified at 108 may be stored by indicating an association or a link between the tasks stored in the task associations database 126.

In one aspect, a task association graph representing a graph of tasks and their inter-dependence may be generated based on the task associations identified at 108 and, e.g., stored at 126. The graph may comprise a plurality of tasks as nodes and their inter-dependence as connections between the nodes. The graph may be represented as a data structure of nodes and links between the nodes.

At 110, task associations may be analyzed. For example, the task association graph may be analyzed. Analysis may comprise determining task-task synergies, person-task synergies, and person-person synergies. Based on the analysis, the tasks may be modularized. Modularized tasks may be presented candidates for parallel execution. Also, based on the analysis, critical tasks (considered critical based on a defined threshold or one or more criteria) may be identified. The identified critical tasks may be suggested to be performed by a resource that can better handle such critical tasks, e.g., resource that has more experience. Further, based on the analysis, one or more task assignments and scheduling may be optimized at 130, e.g., by considering task-task, person-task, and person-person synergies, and available resources. The information associated with the resources may be stored in a storage device, e.g., as a database storing information about resources, e.g., engineer work on tasks 128.

At 112, collaboration guidance for task owners may be generated based on resource-artifact association 124, stored in a storage device and the determined assignment and/or scheduling determined at 130. Resource-artifact association database 124 may store the associations between resources and artifacts, e.g., who is the owner of an artifact, how familiar a resource is with an artifact. Such an association indicates whether a resource has enough knowledge to work on an artifact. The associations can be obtained from historical task submission logs which record tasks submitted by resources and artifacts modified by the resources through tasks.

Figure 3:
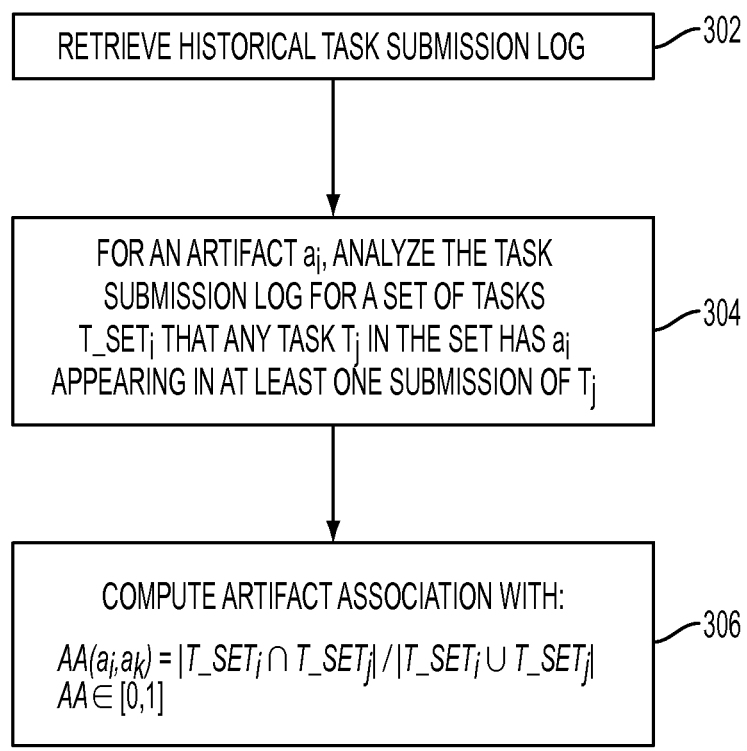
FIG. 3 shows an example algorithm for identifying artifact association in one embodiment of the present disclosure.

FIG. 3 shows an example algorithm for identifying artifact association in one embodiment of the present disclosure, e.g., shown at 102. Artifact association between two articles identifies the frequency to which the two artifacts are modified by the same task or same tasks (e.g., a number of tasks that modify the both artifacts, the number represented in a normalized form). At 302, historical task submission log may be retrieved. At 304, for an artifact $a_i$, the example algorithm may analyze the task submission log for a set of tasks $T\_SET_i$ that any task $T_j$ in the set has $a_i$ appearing in at least one submission of $T_j$. At 306, artifact association (AA) may be computed with Jaccard Index, e.g., as follows:

$$AA(a_j, a_k) = |T\_SET_j \cap T\_SET_j| / |T\_SET_i \cup T\_SET_j|$$

$$AA \in [0,1]$$

For example, given artifact a1 that appears in the submission of three historical tasks, HT1, HT2, HT3, and artifact a2 that appears in the submission of two historical tasks, HT2, HT4, artifact association (AA) may be computed as follows:

$$AA(a1, a2) =$$
$$|\{HT1, HT2, HT3\} \cap \{HT2, HT4\}| / |\{HT1, HT2, HT3\} \cup \{HT2, HT4\} =$$
$$|\{HT2\}| / |\{HT1, HT2, HT3, HT4\}| = 1/4 = 0.25$$

Figure 4:
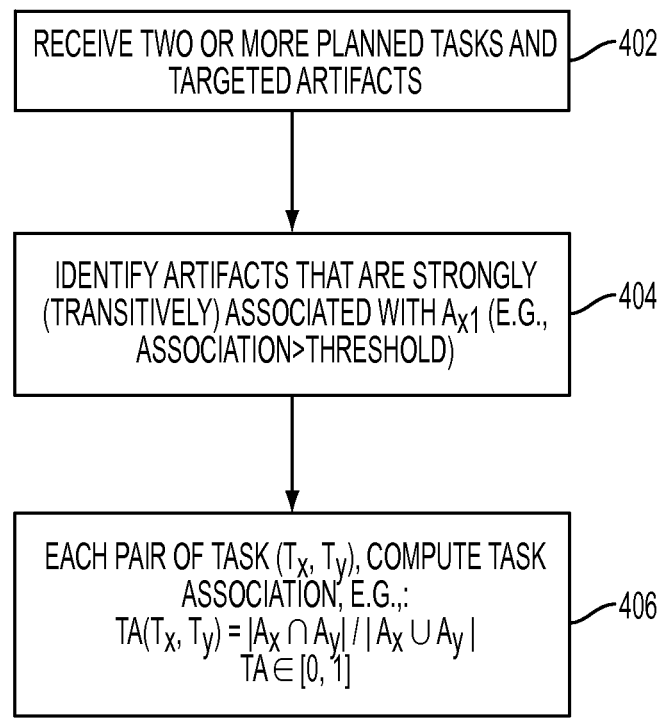
FIG. 4 shows an example algorithm for identifying task association in one embodiment of the present disclosure.

FIG. 4 shows an example algorithm for identifying task association in one embodiment of the present disclosure. Task association represents an estimated possibility that two (planned) tasks impact the same artifact or artifacts. At 402, two or more planned tasks and targeted artifacts may be received. For example, at design or plan phase of an application, the designer may indicate the artifacts that will be directly modified by a task x. Call this set of artifacts $A_{x1}$.

At 404, the example algorithm may identify artifacts that are strongly (transitively) associated with $A_{x1}$ (e.g., association>threshold). Threshold value may be predefined, or may be configurable. Call this set $A_{x2}$. Let $A_x = A_{x1} \cup A_{x2}$. "U" represents union operation.

At 406, for each pair of task ($T_x$, $T_y$), the example algorithm may compute task association between them as the Jaccard Index as follows:

$$TA(T_x, T_y) = |A_x \cap A_y| / |A_x \cup A_y|$$

$$TA \in [0,1]$$

Figure 5:
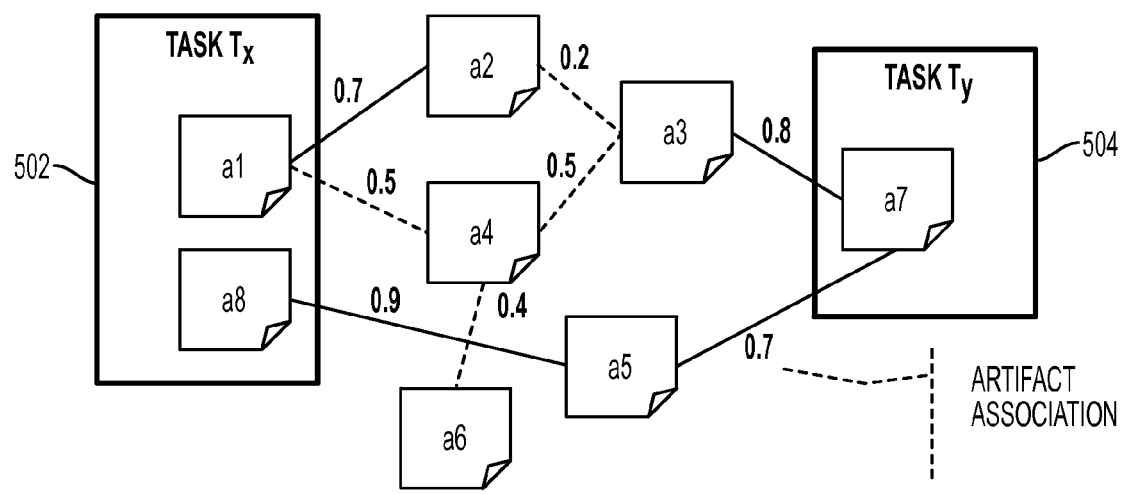
FIG. 5 is a diagram showing example task association identification in one embodiment of the present disclosure.

FIG. 5 is a diagram showing example task association identification in one embodiment of the present disclosure. Task $T_x$ has targeted artifacts a1 and a8 that it modifies as shown at 502. Task $T_y$ has targeted artifact a7 that it modifies as shown at 504. Artifact associations, e.g., as identified by running the algorithm shown in FIG. 4, are shown with connecting lines that connect the artifacts (a1, . . . , a8). The numbers shown in the connecting lines represent an artifact association value between the artifacts that are connected. In the example, the threshold for determining strong association is 0.6. A dotted line indicates that the association is below the threshold. For example, a1 and a2 has artifact association of 0.7; a1 and a4 has artifact association of 0.5; a8 and 15 has artifact association of 0.9; a2 and a3 has artifact association of 0.2; a4 and a3 has artifact association of 0.5; a4 and a6 has artifact association of 0.4; a3 and a7 has artifact association of 0.8; a5 and a7 has artifact association of 0.7.

Consider as an example that the artifact association threshold is set to 0.6. Then, $$TA(T_x, T_y) = |\{a1, a2, a8, a5, a7, a3\} \cap \{a7, a3, a5, a8\}| /$$
$$|\{a1, a2, a8, a5, a7, a3\} \cup \{a7, a3, a5, a8\}| = 4/6 = 0.67$$

Hence, in the above example, task association between tasks $T_x$ and $T_y$ is computed as 0.67.

Figure 6:
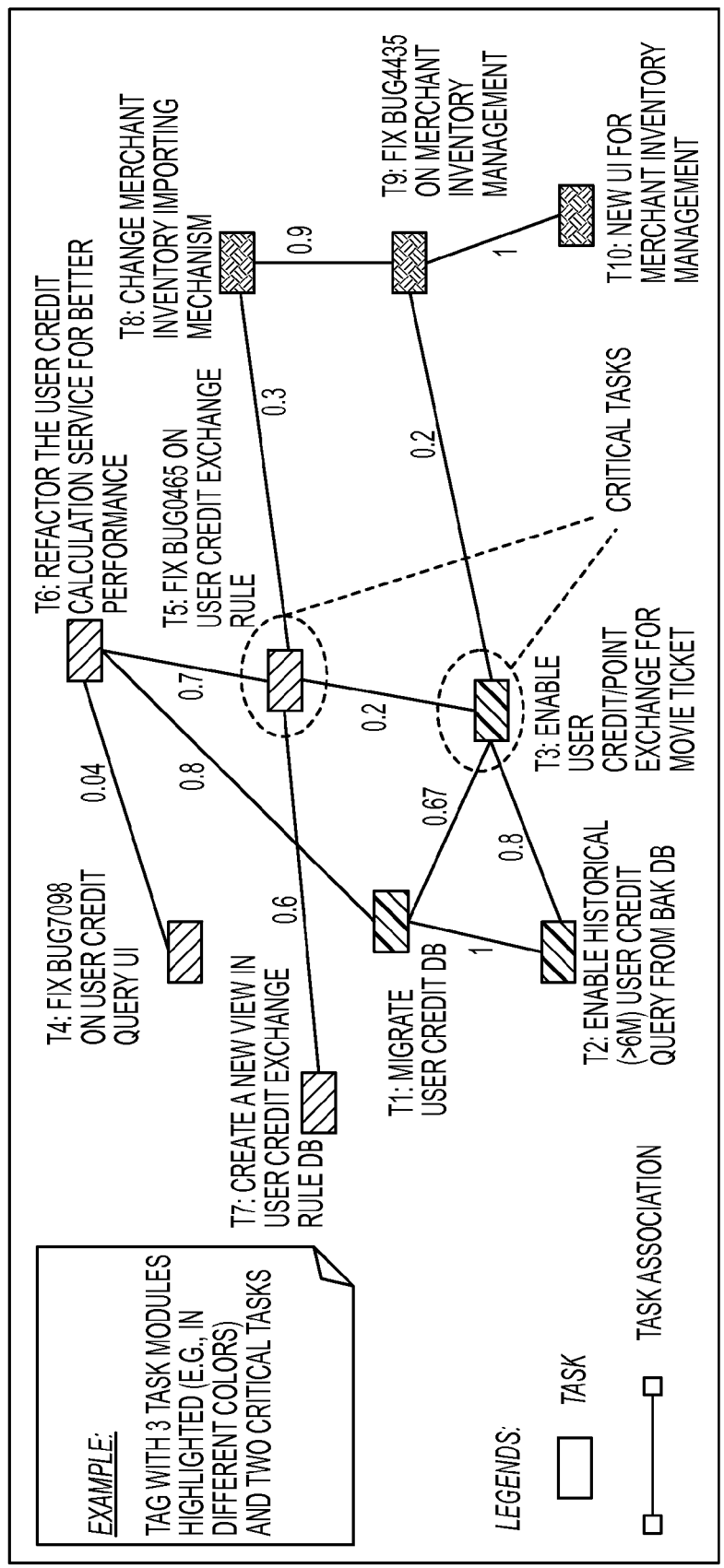
FIG. 6 shows an example task association graph in one embodiment of the present disclosure.

Using the task association values, e.g., computed as described above, a task association graph (TAG) may be generated. FIG. 6 shows an example task association graph (TAG) with 3 task modules highlighted (e.g., in different colors) and two critical tasks. A task association degree may define how many connections a task has. For instance, more connections a task has, the more critical that task may be considered. In the example shown in FIG. 6, the degree centrality of T3 is 4, normalized degree centrality of T3 is 4/12=0.33 (number of connections with T3/total number of connections; the degree centrality of T5 is 4, normalized degree centrality of T5 is 4/12=0.33.

Using such task association graph or a representation of such task associations, tasks may modularized or modularity of tasks may be detected. TAG modularization method may utilize Clauset-Newman-Moore network community detection algorithm in one embodiment of the present disclosure. Modularity measures the strength of division of a network into modules graph with high modularity having dense connections between the nodes within modules but sparse connections between nodes in different modules. If a TAG has high modularity, tasks can be grouped in modules. Whether modularity is high or low may be measured based on a predefined threshold number of connections between nodes.

It may be determined that the tasks in the same module are better to be assigned to the same resource, the tasks owned by separate owners are better to be loosely associated.

Also using such task association graph or a representation of such task associations, "critical tasks" may be identified. A task with high degree centrality (i.e., the total number of edges) is identified as a critical task, which is associated with many other tasks. As an example, degree centrality can be normalized as: total number of edges related to this task/total number of edges in the TAG. It may be determined that critical tasks should be assigned to more experienced resource.

Also, a task may be better to be assigned to resource familiar with the artifacts related to the task (e.g., who worked on these artifacts, which can be also analyzed based on the historical task submission logs). TAG analysis may provide such information.

In another aspect, based on analyzing the task associations, e.g., TAG analysis, task assignments and/or scheduling may be optimized. Optimizing assignments and/or scheduling may include minimizing time to complete work, minimizing cost, and balancing utilization, subject to constraints such as role/skill required to do the work and cost of resources. In one embodiment of a methodology of the present disclosure, optimization may be performed with synergy-based objective, e.g., to maximize the synergy between tasks (task to task (task-task) synergy), the synergy between person and task (person to task (person-task) synergy) and the synergy between persons (person to person (person-person) synergy). Highly associated tasks (e.g., determined by task-task synergy) may be better to be assigned to the task owner for performing the tasks sequentially. For instance, highly associated tasks may be better to be assigned to a single task owner so that the task owner can determine how to execute them completely by the single task owner (without coordination with others). In case these tasks cannot be executed by a single resource, they may be better to be assigned to resources that have good person-person synergy (e.g., they can work together well, e.g., collaborated in the past, belong to the same group, etc.). In this way, the assigned task owners collaborate on task execution. The synergy between them can make the collaboration easy. The execution sequence of highly associated tasks may be up to assigned task owners to determine. The more critical a task is, more expertise may be needed for the assigned task owner; such resource may be identified based on person-task synergy, e.g., a person who is more aligned to perform the task. Highly associated tasks imply strong collaboration. These tasks may be better to be assigned to people with high person-person synergy (e.g., same workgroup, close collaboration experience in the past, worked on the same application artifact). Person-person synergy may be determined based on historical data and other data such as social media data. Determination as to whether a value is high may be based on a threshold or criterion (e.g., highly associated tasks, high person-person synergy).

Figure 7:
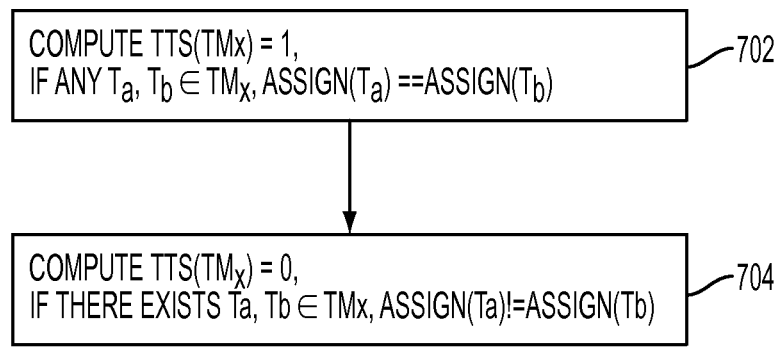
FIG. 7 shows an example algorithm for determining or modeling task-task synergy in one embodiment of the present disclosure.

FIG. 7 shows an example algorithm for determining or modeling task-task synergy in one embodiment of the present disclosure. Let: Assign(Tx)=$E_y$, $E_y \in \{E_1, \ldots, E_n\}$ if task x is assigned to engineer $E_y$. For every task module $TM_x$, an example algorithm may formulate a Task-Task synergy (TTS) as shown at 702 and 704. At 702, compute TTS (TMx)=1, if any $T_a$, $T_b \in TM_x$, Assign($T_a$)==Assign($T_b$). At 704, compute TTS(TMx)=0, if there exists Ta, Tb∈TMx, Assign(Ta)!=Assign(Tb). TTS(TMx) is for a group of tasks in a module.

Figure 8:
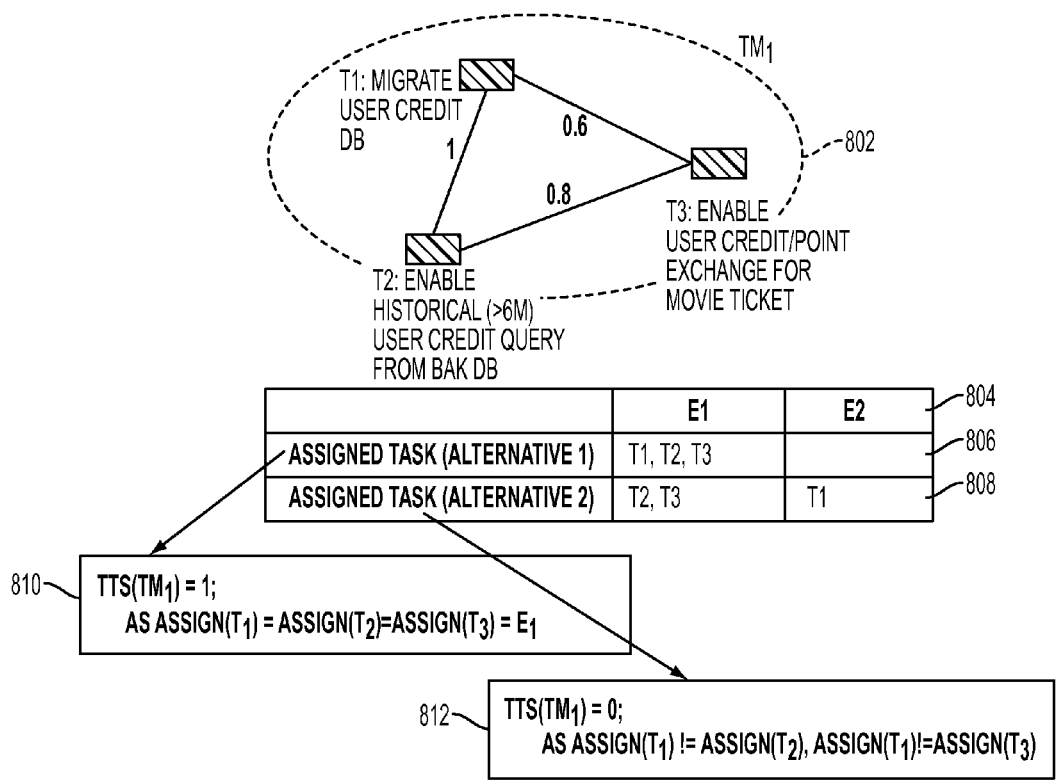
FIG. 8 shows an example diagram showing task-task synergy among tasks in one embodiment of the present disclosure.

FIG. 8 shows an example diagram showing task-task synergy among tasks in one embodiment of the present disclosure. A task module $TM_1$ 802 may include tasks T1, T2 and T3. Task assignment options are shown at 804. Task-task synergy of tasks in $TM_1$ for the task assignment option shown in the first row 806 as alternative 1 may be computed as shown at 810. Task-task synergy of tasks in $TM_1$ for the task assignment option shown in the second row 808 as alternative 2 may be computed as shown at 812. In this example computation, task assignment of alternative 1 is determined to be better than alternative 2 because alternative 1 has TTS($TM_1$) of 1.

Figure 9:
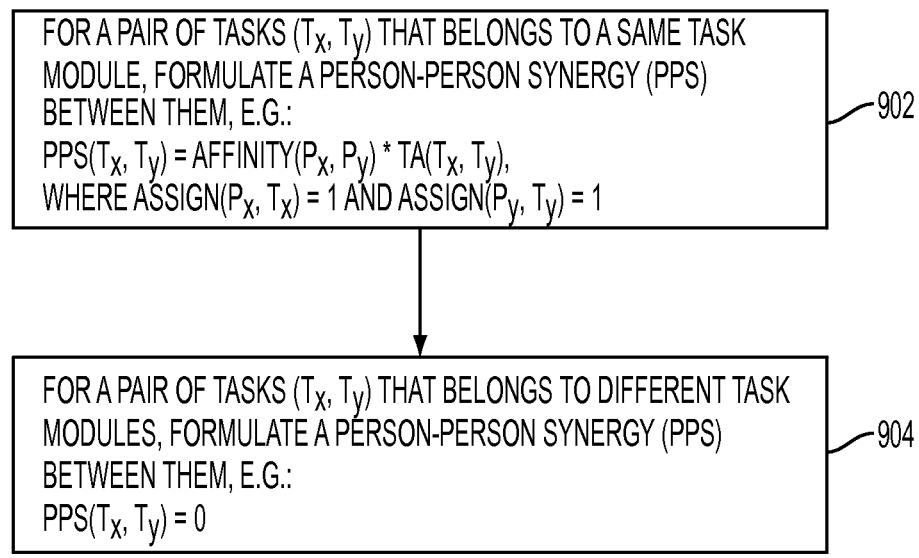
FIG. 9 shows an example algorithm for determining or modeling task-task synergy in one embodiment of the present disclosure.

FIG. 9 shows an example algorithm for determining or modeling person-person synergy in one embodiment of the present disclosure. Let Affinity(Px, Py)∈[0, 1] is a pre-analyzed association between resource x and resource y, the larger the value is, the closer they are in past delivery activities. Assign(Px, Ty)=1 if task y is assigned to resource x; Assign(Px, Ty)=0 if task y is NOT assigned to resource x; At 902, for each pair of tasks ($T_x$, $T_y$) that belongs to a same task module, the example algorithm may formulate a Person-Person synergy (PPS) between them. An example formula may include:

$$PPS(T_x, T_y) = \text{Affinity}(P_x, P_y) * TA(T_x, T_y),$$

where Assign($P_x$, $T_x$)=1 and Assign($P_y$, $T_y$)=1.

In the above formula, Affinity($P_x$, $P_y$) represents relationship between persons or resource $P_x$, $P_y$. Such affinity may be determined based on historical data that show, e.g., whether $P_x$, $P_y$ collaboratively worked together and how frequently. TA($T_x$, $T_y$) represents task association between $T_x$, $T_y$.

At 904, for each pair of tasks ($T_x$, $T_y$) that belongs to different task modules, the example algorithm may formulate a Person-Person synergy (PPS) between them, e.g., as:

$$PPS(T_x, T_y) = 0$$

The above algorithm generally allows for tasks strong associations (strong or high TA) to be assigned to persons with strong associations (strong or high PPS).

Figure 10:
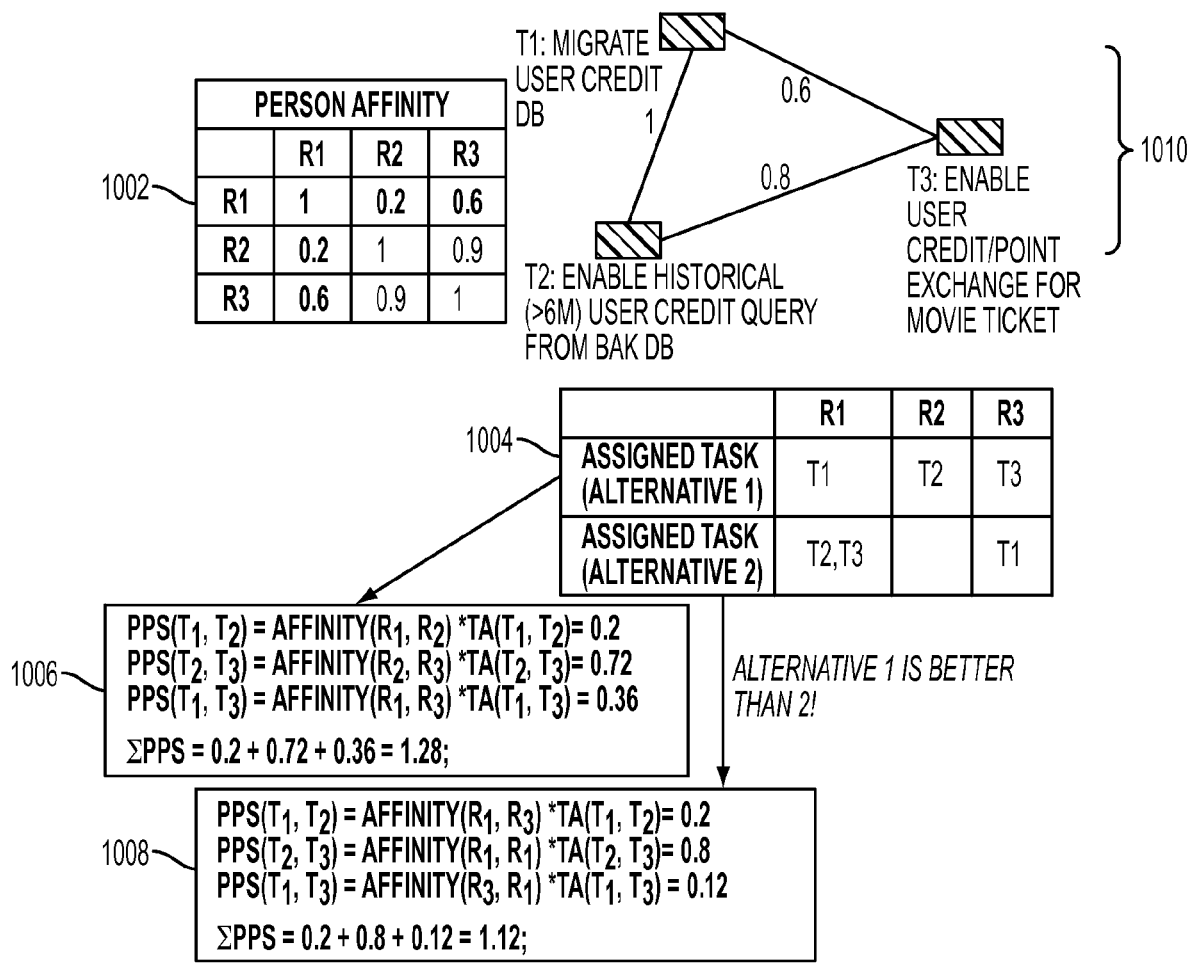
FIG. 10 shows an example task association graph used in person-person synergy computation in one embodiment of the present disclosure.

FIG. 10 shows an example task module used in person-person synergy computation in one embodiment of the present disclosure. As an example, consider the person affinity given at 1002 and the task module with task associations shown as edges between tasks T1, T2, T3 (e.g., task assignment graph 1010) shown in FIG. 10. Possible assignment options for assigning tasks T1, T2 and T3 to resources R1, R2, and R3 are shown at 1004. PPS for assignment of alternative 1 (first row of 1004) is computed as shown at 1006 using the above formula. PPS for assignment of alternative 2 (second row of 1004) is computed as shown at 1008 using the above formula. In this example, assignment option at 1006 is determined to be more beneficial based on the PPS value. For example, assignment option of alternative 1 includes task assignments to resources with higher affinity.

Figure 11:
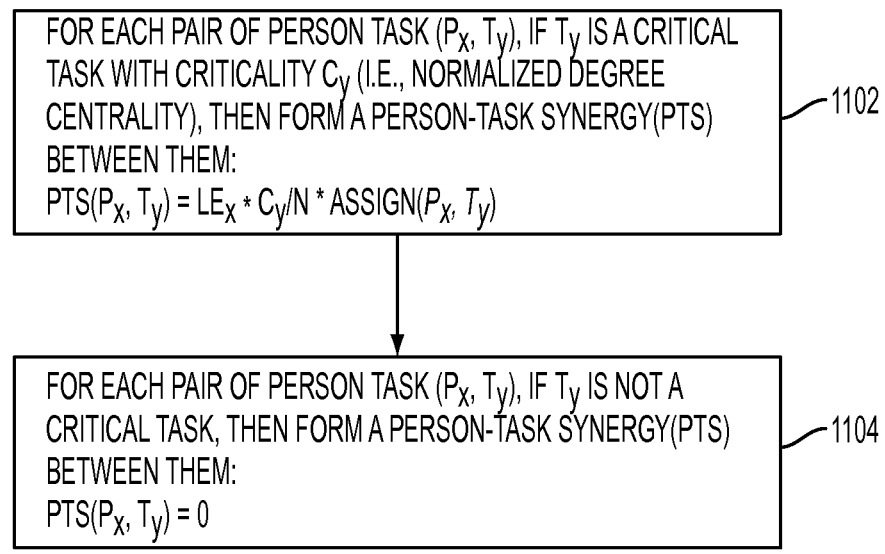
FIG. 11 shows an example algorithm for determining or modeling person-task synergy in one embodiment of the present disclosure.

FIG. 11 shows an example algorithm for determining or modeling person-task synergy in one embodiment of the present disclosure. Let Assign(Px, Ty)=1 if task y is assigned to resource x; Assign(Px, Ty)=0 if task y is NOT assigned to resource x; each person Px in the resource pool has a level of experience LEx, and the total number of experience levels is N. At 1102, for each pair of person task ($P_x$, $T_y$), if $T_y$ is a critical task with criticality $C_y$ (i.e., normalized degree centrality), then the example algorithm may form a Person-Task synergy(PTS) between them, e.g., using the following formula:

$$PTS(P_x,T_y)=LE_x*C_y/N*\text{Assign}(Px,Ty)$$

At 1104, for each pair of person task ($P_x$, $T_y$), if $T_y$ is NOT a critical task, then the example algorithm may form a Person-Task synergy (PTS) between them as:

$$PTS(P_x,T_y)=0$$

Figure 12:
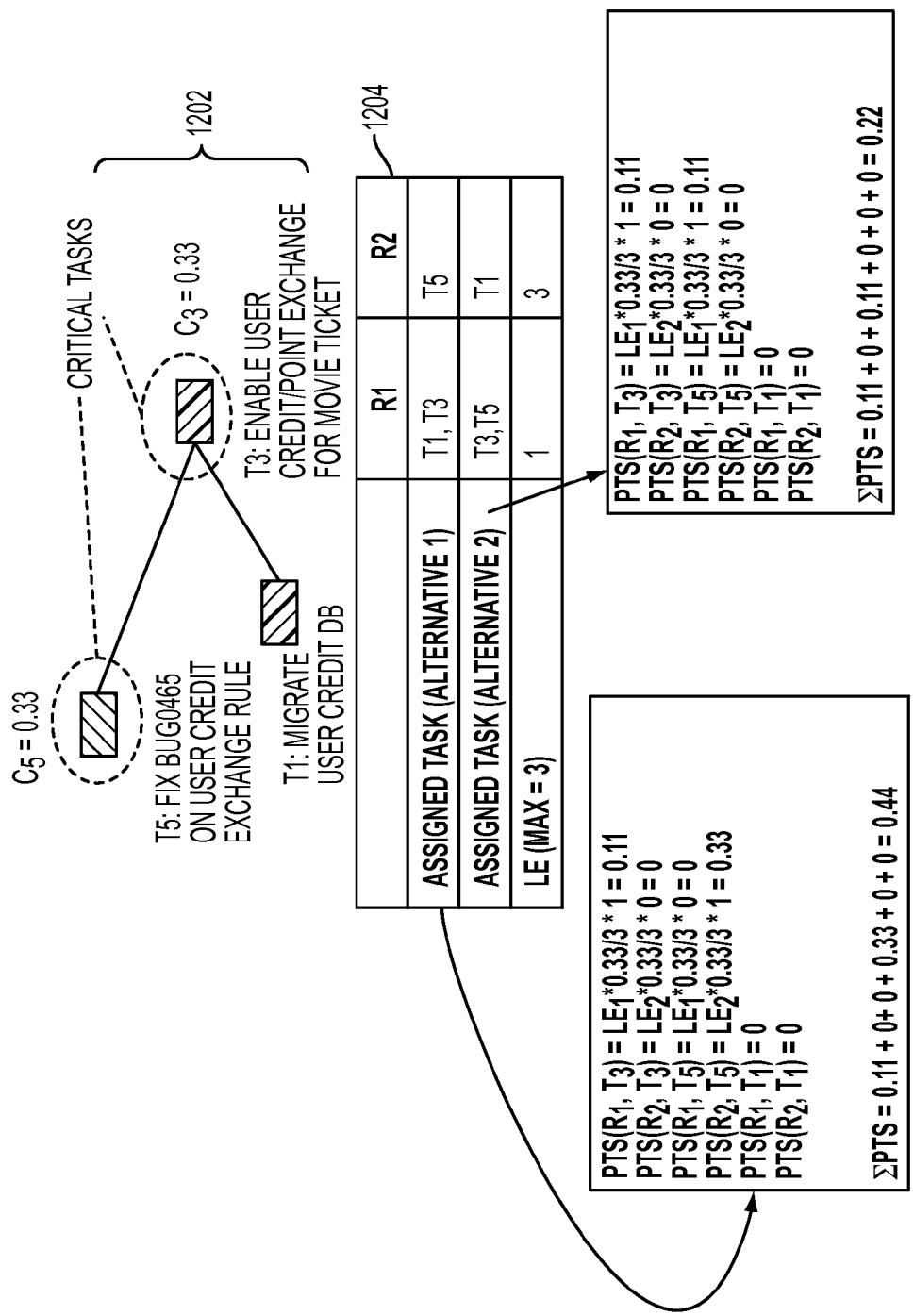
FIG. 12 shows an example task association graph used in person-risk synergy computation in one embodiment of the present disclosure.

FIG. 12 shows an example task association graph used in person-task synergy computation in one embodiment of the present disclosure. As an example, consider the task association given at 1202. Given task T5 with criticality of 0.33 and task T3 with criticality of 0.33, person-task synergy (PTS) is computed for different task assignment plans, e.g., shown at 1204. For example, shown at 1206, for task assignment of alternative 1 shown in the first row of 1204 (T1, T3 to R1 and T5 to R2), PTS is computed to be 0.44; shown at 1208, for task assignment of alternative 2 shown in the second row of 1204 (T3, T5 to R1 and T1 to R2), PTS is computed to be 0.22, using the above PTS computation formula. Task assignment plan that has higher PTS (e.g., alternative 1) is determined to be more beneficial.

Figure 13:
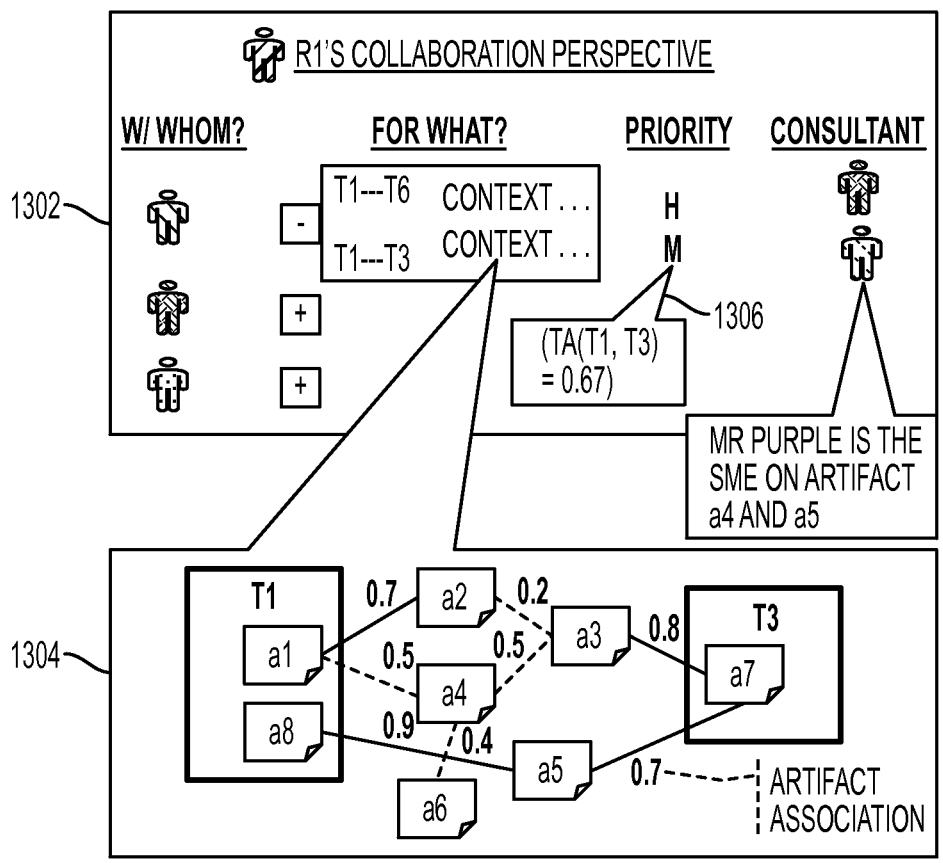
FIG. 13 shows an example collaboration perspective from a point of a resource in one embodiment of the present disclosure.

In one aspect, collaboration guidance may be generated based on the task associations (e.g., represented in a task association graph). Collaboration Guidance tells the task owner who else (including other task owners and related artifact subject matter experts (SMEs)) to collaborate with, why the collaboration is needed, and what is the priority of the collaboration. FIG. 13 shows an example collaboration perspective 1302 from a point of a resource, e.g., R1. Assume that each planned Task has been assigned to corresponding Resource, and let the resource for task $T_x$ be $R(T_x)$, and the tasks assigned to a resource $R_y$ be $T(R_y)$. R(T) represents the resource who works on task T; T(R) represents the tasks that are assigned to R.

To determine with whom to collaborate, an example algorithm may, for each resource $R_x$, identify other resources that he needs to collaborate based on their tasks' association. For example:

Let $T(R_x)=[T_{x1},T_{x2},\ldots,T_{xm}]$ $R(T(R_x))=U\ R(T_{xi}),i\epsilon[1,\ldots,m]$ where m indicates that there are m tasks assigned to R. In one aspect, one task is assigned to one resource; one resource may own multiple tasks.

For each pair of resource that need to collaborate, a methodology of the present disclosure in one embodiment may identify the related task pairs that they should collaborate on based on task associations (e.g., TAG). For every task pair, the methodology of the present disclosure may illustrate the potential artifacts association, e.g., shown at 1304. In this way the collaboration guidance may provide reasons as to why the collaboration may be needed.

To determine the priority of the collaboration, a methodology in one embodiment may, for each collaboration thread, decide the priority based on task association weight and thresholds. For example:

If TA(Tx, Ty) is larger than 0.7, the priority is H;
If TA(Tx, Ty) is between 0.3 and 0.7, the priority is M;
If TA(Tx, Ty) is less than 0.3, the priority is L.

An example priority is shown at 1306, in the collaboration perspective. In one embodiment of the present disclosure, a collaboration perspective and task association graph may be visualized, and e.g., presented to a user via a user interface.

Figure 14:
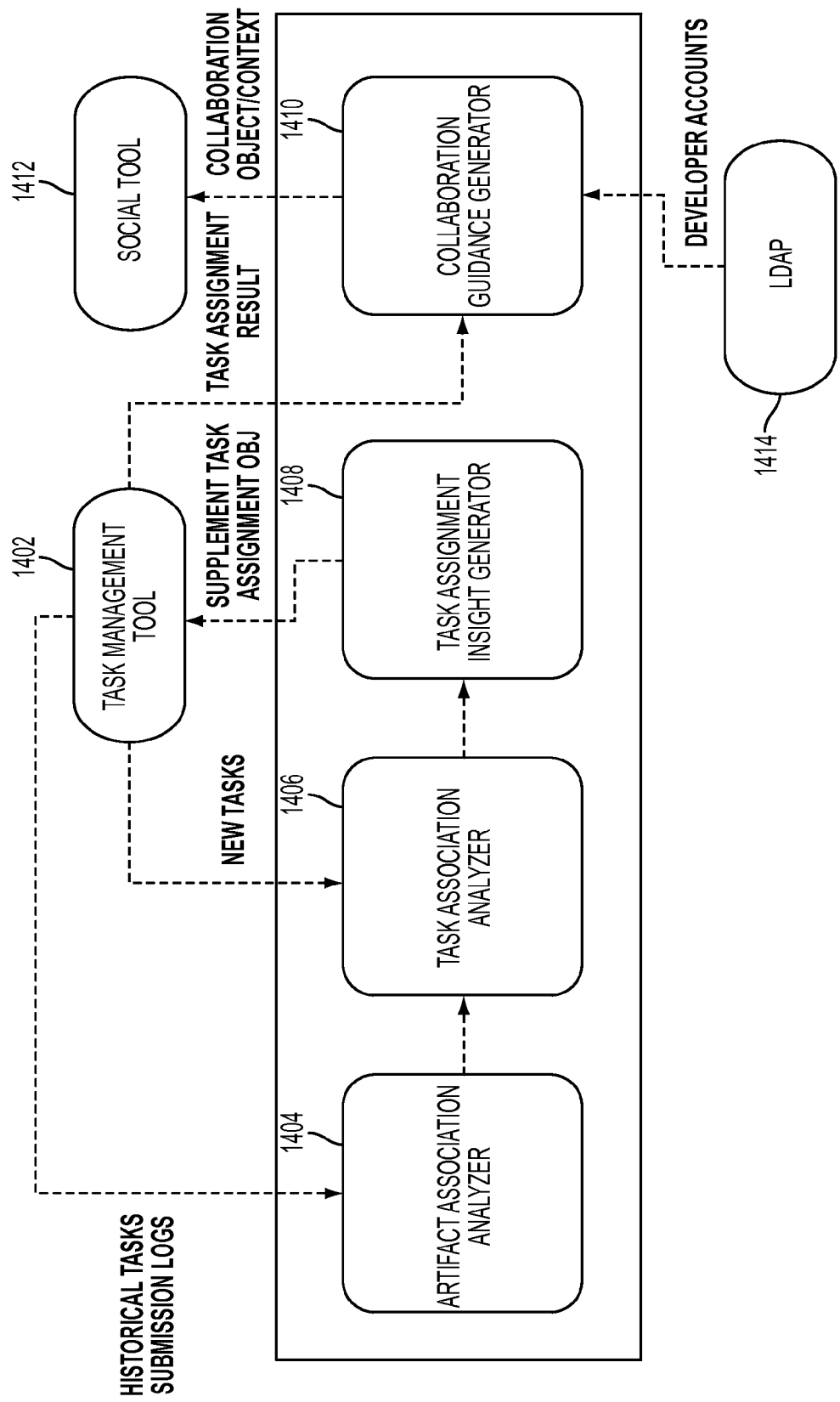
FIG. 14 illustrates components of a system of the present disclosure that may provide for task association analysis in one embodiment.

FIG. 14 illustrates components of a system of the present disclosure that provides for task association analysis in one embodiment. The components may implement, e.g., the methodology described above. The components of the system may be implemented on a hardware processor, e.g., execute on one or more computer processors. The components may perform one or more functionalities for enabling task association analysis described above. For example, the various functionalities may be provided as a task management tool 1402, e.g., computer-implemented and/or computer executable programs, that comprises one or more components for performing the functions for task association analysis. Artifact association analyzer 1404 in one embodiment takes as input historical tasks submission logs, or information or data from such historical tasks submission logs. The logs contain information relating to which task modified which artifacts, e.g., as described above. An example of a log in RTC(Rational Team Concert, an IBM development and task management tool) may include a code submission that includes multiple artifacts and is linked to a work item (task). A comment may be also included in the submission. The artifact association analyzer computes artifact association by analyzing the data in the historical tasks submission logs, for example, received as input. All artifact associations may be stored in a database of artifact associations. An example algorithm for computing artifact association is described with reference to FIG. 3 above.

Task association analyzer 1406 in one embodiment identifies association between tasks. For example, the task association analyzer 1406 may receive as input planned tasks, e.g., two planned tasks. Planned tasks refer to tasks for execution. Based on the artifact associations computed by the artifact association analyzer 1404, e.g., the task association analyzer 1406 identifies association between the received planned tasks. An example algorithm for computing task association is described with reference to FIG. 4 above. Task association may be computed as a normalized value between 0 and 1; as an example, higher value (e.g., closer to 1) may be considered as indicating stronger association. Other representations may be used for task association indication/strength.

Task assignment insight generator 1408 in one embodiment generates insights for task assignment based on task association, e.g., identified by the tasks association analyzer 1406. For example, as described above, task-task synergy, person-task synergy, person-person synergy may be computed and used for assigning tasks, e.g., the planned tasks. For instance, highly associated tasks may be assigned to the same resource; more critical a task is considered to be, more expertise may be required for the assigned resource; highly associated tasks imply strong collaboration, and may be better to be assigned to people with high person-person synergy (e.g., same workgroup, close collaboration experience in the past, worked on the sample application artifact).

Collaboration guidance generator 1410 in one embodiment may determine and present information, e.g., in the perspective of a task owner, such as other task owners and/or subject matter experts with whom to collaborate in performing planned tasks, reasons as to why the suggested collaboration is needed, and the priority of the suggested collaboration, e.g., as described above with reference to FIG. 13. The collaboration guidance generator 1410 may receive as input developer accounts, e.g., from Lightweight Directory Access Protocol (LDAP) server 1414. LDAP 1414 may be utilized to access developer account information. LDAP server 1414 may provide the contact information of a developer. Information such as which developer worked on which tasks, who are the subject matter expert in performing certain tasks may also be accessed. For example, the developer-task mapping may exist in Task Management Tool 1402. Social Tool 1412, e.g., instant messaging and/or other social media tool, allows developers to communicate among one another.

Figure 15:
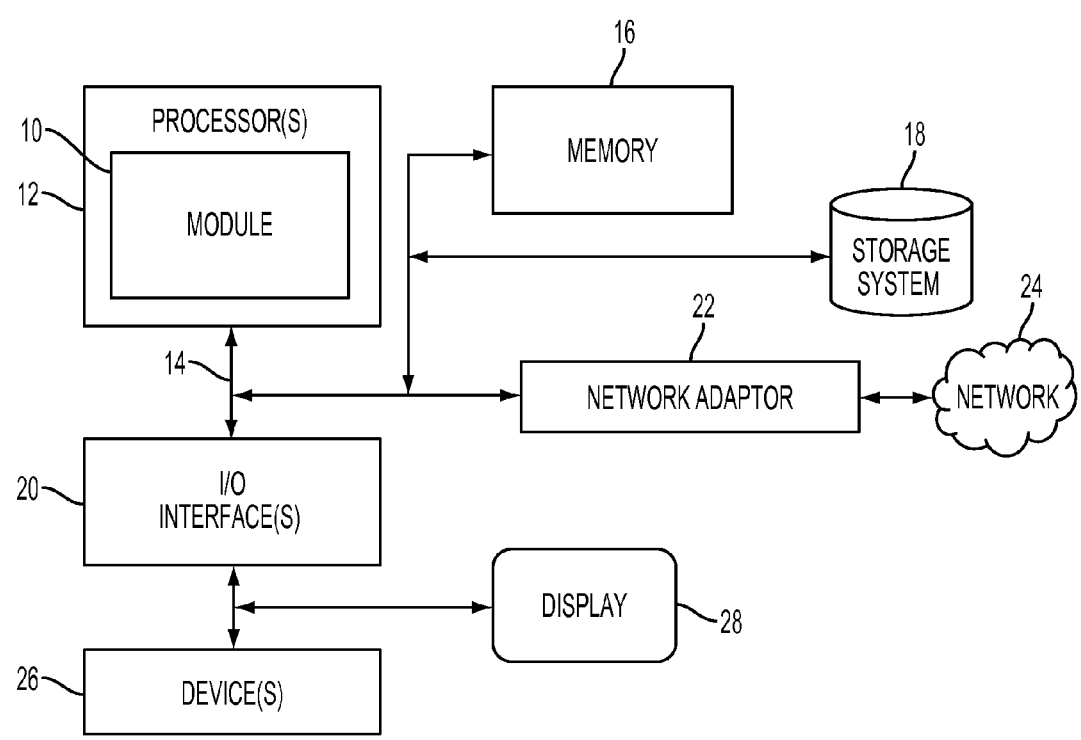
FIG. 15 illustrates a schematic of an example computer or processing system that may implement a system for task association analysis in one embodiment of the present disclosure.

FIG. 15 illustrates a schematic of an example computer or processing system that may implement a system for task association analysis in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 15 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of analyzing task associations, comprising:
computing, by a processor, artifact associations for a plurality of artifacts based on historical task submission logs, an artifact association representing a degree to which two artifacts are processed by a same task, the degree computed by dividing a number of tasks that modify both of the two artifacts by a union of a number of tasks that modify one of the two artifacts and a number of tasks that modify other one of the two artifacts;
receiving planned tasks and targeted artifacts, the targeted artifacts to be modified by one or more of the planned tasks;
determining, by the processor, from the computed artifact associations, shared artifacts that have artifact association with the targeted artifacts;
identifying, by the processor, task association between the planned tasks based on the shared artifacts, wherein a plurality of task associations can be determined for a plurality of tasks; and
analyzing the task associations to determine one or more of task assignment and task schedule for the planned tasks.

2. The method of claim 1, wherein the degree to which two artifacts are processed by a same task comprises a frequency of said two artifacts being modified by the same task.

3. The method of claim 1, further comprising generating a task association graph comprising a plurality of tasks as nodes and connections between the plurality tasks as edges with task association values, wherein the task association values are determined based on the computed artifact associations and task associations between the plurality of tasks, wherein the analyzing the task associations further comprises computing task-task synergies, person-task synergies, and person-person synergies based on the task associations.

4. The method of claim 3, further comprising determining a grouping of the planned tasks based on the task-task synergies, wherein said one or more of task assignment and task schedule for the planned tasks are determined based on the grouping.

5. The method of claim 3, further comprising identifying critical tasks based on a number of task associations the critical tasks have and based on determining whether the number meets a criticality threshold value, wherein the identified critical tasks are assigned based on the person-task synergy.

6. The method of claim 3, wherein the task-task synergy and person-person synergy are used to determine collaborative assignment in said one or more of task assignment and task schedule for the planned tasks.

7. A computer readable storage medium storing a program of instructions executable by a machine to perform a method of analyzing task associations, the method comprising:
computing, by a processor, artifact associations for a plurality of artifacts based on historical task submission logs, an artifact association representing a degree to which two artifacts are processed by a same task, the degree computed by dividing a number of tasks that modify both of the two artifacts by a union of a number of tasks that modify one of the two artifacts and a number of tasks that modify other one of the two artifacts;
receiving planned tasks and targeted artifacts, the targeted artifacts to be modified by one or more of the planned tasks;
determining, by the processor, from the computed artifact associations, shared artifacts that have artifact association with the targeted artifacts;
identifying, by the processor, task association between the planned tasks based on the shared artifacts, wherein a plurality of task associations can be determined for a plurality of tasks; and
analyzing the task associations to determine one or more of task assignment and task schedule for the planned tasks.

8. The computer readable storage medium of claim 7, wherein the degree to which two artifacts are processed by a same task comprises a frequency of said two artifacts being modified by the same task.

9. The computer readable storage medium of claim 7, further comprising generating a task association graph comprising a plurality of tasks as nodes and connections between the plurality tasks as edges with task association values, wherein the task association values are determined based on the computed artifact associations and task associations between the plurality of tasks.

10. The computer readable storage medium of claim 7, wherein the analyzing the task associations further comprises computing task-task synergies, person-task synergies, and person-person synergies based on the task associations.

11. The computer readable storage medium of claim 10, further comprising determining a grouping of the planned tasks based on the task-task synergies, wherein said one or more of task assignment and task schedule for the planned tasks are determined based on the grouping.

12. The computer readable storage medium of claim 10, further comprising identifying critical tasks based on a number of task associations the critical tasks have and based on determining whether the number meets a criticality threshold value, wherein the identified critical tasks are assigned based on the person-task synergy.

13. The computer readable storage medium of claim 10, wherein the task-task synergy and person-person synergy are used to determine collaborative assignment in said one or more of task assignment and task schedule for the planned tasks.

14. A system for analyzing task associations, comprising:
a hardware processor; and
a storage device,
the hardware processor operable to compute artifact associations for a plurality of artifacts based on historical task submission logs, an artifact association representing a degree to which two artifacts are processed by a same task, the degree computed by dividing a number of tasks that modify both of the two artifacts by a union of a number of tasks that modify one of the two artifacts and a number of tasks that modify other one of the two artifacts, and further operable to store the artifact association on the storage device,
the hardware processor further operable to receive planned tasks and targeted artifacts, the targeted artifacts to be modified by one or more of the planned tasks,
the hardware processor further operable to determine from the computed artifact associations, shared artifacts that have artifact association with the targeted artifacts,
the hardware processor further operable to identify task association between the planned tasks based on the shared artifacts, wherein a plurality of task associations can be determined for a plurality of tasks, and the hardware processor further operable to analyze the task associations to determine one or more of task assignment and task schedule for the planned tasks.

15. The system of claim 14, wherein the degree to which two artifacts are processed by a same task comprises a frequency of said two artifacts being modified by the same task.

16. The system of claim 14, wherein the hardware processor is further operable to generate a task association graph comprising a plurality of tasks as nodes and connections between the plurality tasks as edges with task association values, wherein the task association values are determined based on the computed artifact associations and task associations between the plurality of tasks.

17. The system of claim 14, wherein the hardware processor is further operable to compute task-task synergies, person-task synergies, and person-person synergies based on the task associations.

18. The system of claim 17, wherein the hardware processor is further operable to determine a grouping of the planned tasks based on the task-task synergies, wherein said one or more of task assignment and task schedule for the planned tasks are determined based on the grouping.

19. The system of claim 17, wherein the hardware processor is further operable to identify critical tasks based on a number of task associations the critical tasks have and based on determining whether the number meets a criticality threshold value, wherein the identified critical tasks are assigned based on the person-task synergy.

20. The system of claim 17, wherein the hardware processor further determines collaborative assignment in said one or more of task assignment and task schedule for the planned tasks, based on the task-task synergy and person-person synergy.

* * * * *